United States Patent
Tang (10) Patent No.: US 11,234,175 B2
(45) Date of Patent: Jan. 25, 2022

(54) METHOD FOR SELECTING CELL, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/763,934

(22) PCT Filed: Nov. 13, 2017

(86) PCT No.: PCT/CN2017/110696
§ 371 (c)(1),
(2) Date: May 13, 2020

(87) PCT Pub. No.: WO2019/090763
PCT Pub. Date: May 16, 2019

(65) Prior Publication Data
US 2020/0359286 A1 Nov. 12, 2020

(51) Int. Cl.
*H04W 4/00* (2018.01)
*H04W 36/00* (2009.01)
(Continued)

(52) U.S. Cl.
CPC ............. *H04W 36/08* (2013.01); *H04W 8/24* (2013.01); *H04W 16/14* (2013.01); *H04W 36/06* (2013.01);
(Continued)

(58) Field of Classification Search
CPC ....... H04W 36/08; H04W 8/24; H04W 16/14; H04W 36/06; H04W 48/16; H04W 48/20; H04W 72/0453; H04W 72/10
See application file for complete search history.

(56) References Cited

U.S. PATENT DOCUMENTS

2015/0237560 A1   8/2015   Saida
2015/0312808 A1   10/2015  Kiss
(Continued)

FOREIGN PATENT DOCUMENTS

CN   102448143   5/2012
CN   103037469   4/2013
(Continued)

OTHER PUBLICATIONS

EPO, Partial Supplementary European Search Report for EP Application No. 17931694.8, dated Nov. 9, 2020.
(Continued)

*Primary Examiner* — Erika A Washington
(74) *Attorney, Agent, or Firm* — Hodgson Russ LLP (57) ABSTRACT

Embodiments of the present application implement cell selection and cell reselection for a terminal device in a licensed band and an unlicensed band. Disclosed are a method for selecting a cell, a terminal device, and a network device. The method comprises: a terminal device searches for a target frequency point on the basis of at least one of preconfigured first configuration information, of second configuration information configured by a network using a dynamic signaling, and of a work mode set by a user; and performs cell selection or cell reselection on the basis of a state of a cell on the target frequency.

15 Claims, 3 Drawing Sheets

200

Terminal device searches for a target frequency point according to at least one of pre-configured first configuration information, second configuration information configured by a network through dynamic signaling, and a working mode set by a user — S210

Perform cell selection or cell reselection according to a situation of cells at the target frequency point — S220

(51) Int. Cl.

| | | |
|---|---|---|
| *H04W 36/08* | (2009.01) | |
| *H04W 8/24* | (2009.01) | |
| *H04W 16/14* | (2009.01) | |
| *H04W 36/06* | (2009.01) | |
| *H04W 48/16* | (2009.01) | |
| *H04W 48/20* | (2009.01) | |
| *H04W 72/04* | (2009.01) | |
| *H04W 72/10* | (2009.01) | |

(52) U.S. Cl.
CPC .......... *H04W 48/16* (2013.01); *H04W 48/20* (2013.01); *H04W 72/0453* (2013.01); *H04W 72/10* (2013.01)

(56) References Cited

U.S. PATENT DOCUMENTS

| | | | |
|---|---|---|---|
| 2016/0073404 A1 | 3/2016 | Vutukuri et al. | |
| 2016/0112907 A1* | 4/2016 | Gopal | H04W 36/0072 370/332 |
| 2017/0070931 A1 | 3/2017 | Huang et al. | |
| 2018/0352508 A1* | 12/2018 | Fujishiro | H04W 24/10 |
| 2019/0387468 A1 | 12/2019 | Feng | |

FOREIGN PATENT DOCUMENTS

| | | |
|---|---|---|
| CN | 103428708 | 12/2013 |
| CN | 103546940 | 1/2014 |
| CN | 104038984 | 9/2014 |
| CN | 105007606 | 10/2015 |
| CN | 105025539 | 11/2015 |
| CN | 105430677 | 3/2016 |
| CN | 106160968 | 11/2016 |
| CN | 106973391 | 7/2017 |
| WO | 2017067003 | 4/2017 |

OTHER PUBLICATIONS

WIPO, ISR for PCT/CN2017/110696, Aug. 2, 2018.
EPO, Extended European Search Report for EP Application No. 17931694.8, dated Feb. 9, 2021.
Liu et al., "Performance Analysis of Access Strategy Based on Spectrum Pool in Cognitive Wireless Network," Journal of Beijing University of Posts and Telecommunications, 2009, vol. 32, No. 1, 4 pages.
LG Electronics, "Status Report of WI: Support for V2V services based on LTE sidelink," 3GPP TSG RAN meeting #72, RP-160792, Jun. 2016, 23 pages.
Ericsson, "Email Discussion (78bis-15) Summary on Evaluation Methodology for LAA," 3GPP TSG RAN WG1 Meeting #79, R1-144775, Nov. 2014, 24 pages.
EPO, Communication for EP Application No. 17931694.8, dated Aug. 5, 2021.
CNIPA, First Office Action for CN Application No. 201780096579.8, dated Oct. 11, 2021.
KIPO, Office Action for KR Application No. 10-2020-7015855, dated Jul. 30, 2021.

* cited by examiner

Terminal device searches for a target frequency point according to at least one of pre-configured first configuration information, second configuration information configured by a network through dynamic signaling, and a working mode set by a user — S210

Perform cell selection or cell reselection according to a situation of cells at the target frequency point — S220

Network device determines second configuration information according to at least one of capability of a terminal device, subscription information, and preference of a terminal device — S310

Network device sends the second configuration information to the terminal device — S320

METHOD FOR SELECTING CELL, TERMINAL DEVICE, AND NETWORK DEVICE

CROSS-REFERENCE TO RELATED APPLICATION

This application is a U.S. national phase application of International Application No. PCT/CN2017/110696, filed Nov. 13, 2017, the entire disclosure of which is incorporated herein by reference.

TECHNICAL FIELD

Embodiments of the present application relate to the field of communications, and more specifically, to a method for selecting a cell, a terminal device, and a network device.

BACKGROUND

In a Long Term Evolution (LTE) system, License-assisted Access (LAA) technology is introduced. Specifically, a primary cell (PCell) can be configured on a licensed frequency band and assisted by the licensed frequency band, so that a secondary cell (SCell) can be configured on an unlicensed frequency band, thereby achieving data transmission on an unlicensed frequency band.

SUMMARY

Provided are a method for selecting a cell, a terminal device, and a network device.

In a first aspect, there is provided a method for selecting a cell, including:

a terminal device searching for a target frequency point according to at least one of pre-configured first configuration information, second configuration information configured by a network through dynamic signaling, and a working mode set by a user; and performing, according to a situation of cells at the target frequency point, cell selection or cell reselection.

In view of the first aspect, in some implementations of the first aspect, the first configuration information includes information of a first frequency point set and/or first frequency priority information, and the second configuration information includes information of a second frequency point set and/or second frequency priority information.

In view of the first aspect, in some implementations of the first aspect, the second frequency priority information is determined by the network device according to at least one of the capability of the terminal device, subscription information and the reference of the terminal device and is configured to the terminal device through the dynamic signaling.

In view of the first aspect, in some implementations of the first aspect, the second frequency priority information has a priority higher than a priority of the first frequency priority information, and the working mode set by the user has a priority higher than the first configuration information and the second configuration information.

In view of the first aspect, in some implementations of the first aspect, the terminal device searching for the target frequency point according to at least one of the pre-configured first configuration information, the second configuration information configured by the network through the dynamic signaling, and the working mode set by the user, includes:

if the user sets the working mode to indicate to perform cell selection or cell reselection only in an unlicensed frequency band, determining, by the terminal device among the first frequency point set or the second frequency point set, a frequency point inside the unlicensed frequency band as the target frequency point, and searching for the target frequency point; or if the user does not set the working mode to indicate to perform cell selection or reselection only in the unlicensed frequency band, determining, by the terminal device, a frequency point among frequency points inside unlicensed frequency band and licensed frequency band as the target frequency point, wherein the frequency points belong to the first frequency point set or the second frequency point set, and performing searching by searching for the target frequency point.

In one embodiment, the transmission mode set by the user may also be used to indicate that the priority of the frequency points of the unlicensed frequency band is higher than the priority of the frequency points of the licensed frequency band, or the priority of the frequency points of the licensed frequency band is higher than the priority of the frequency points of the unlicensed frequency band, which is not limited in the embodiment of the present application.

In view of the first aspect, in some implementations of the first aspect, the first frequency priority information is used to indicate a priority order of the frequency points of the licensed frequency band and the unlicensed frequency band, and the terminal device searching for the target frequency point according to at least one of the pre-configured first configuration information, the second configuration information configured by the network through the dynamic signaling, and the working mode set by the user includes:

if the priority of the frequency points of the unlicensed frequency band is higher than the priority of the frequency points of the licensed frequency band, determining, preferentially by the terminal device among the first frequency point set, the frequency point inside the unlicensed frequency band, as the target frequency point, and searching for the target frequency point; or if the priority of the frequency points of the licensed frequency band is higher than the priority of the frequency points of the unlicensed frequency band, determining, preferentially by the terminal device among the first frequency point set, the frequency point inside the licensed frequency band, as the target frequency point, and searching for the target frequency point.

In view of the first aspect, in some implementations of the first aspect, the second frequency priority information is used to indicate the priority order of the frequency points of the licensed frequency band and the unlicensed frequency band, and the terminal device searching for the target frequency point according to at least one of the pre-configured first configuration information, the second configuration information configured by the network through the dynamic signaling, and the working mode set by the user includes:

if the priority of the frequency points of the unlicensed frequency band is higher than the priority of the frequency points of the licensed frequency band, determining, preferentially by the terminal device among the second frequency point set, the frequency point inside the unlicensed frequency band, as the target frequency point, and searching for the target frequency point; or if the priority of the frequency points of the licensed frequency band is higher than the priority of the frequency points of the unlicensed frequency band, determining, preferentially by the terminal device among the second frequency point set, the frequency point inside the licensed frequency band, as the target frequency point, and searching for the target frequency point.

In view of the first aspect, in some implementations of the first aspect, the method further includes:

the terminal device receiving a master information block MIB of a first cell corresponding to the target frequency point, wherein the MIB includes indication information, and the indication information is used to indicate whether the first cell supports a primary cell function.

In view of the first aspect, in some implementations of the first aspect, the performing cell selection or cell reselection according to the situation of cells at the target frequency point includes:

the terminal device performing cell selection or cell reselection according to the indication information.

In view of the first aspect, in some implementations of the first aspect, the terminal device performing cell selection according to the indication information includes:

if the indication information indicates that the first cell supports the primary cell function, the terminal device determining whether to camp on the first cell according to a signal quality of the first cell; or if the indication information indicates that the first cell does not support the primary cell function, the terminal device determining not to camp on the first cell.

In view of the first aspect, in some implementations of the first aspect, the method further includes:

the terminal device receiving a system information block SIB of the first cell corresponding to the target frequency point, wherein the SIB includes a cell reselection condition, and the cell reselection condition includes a signal quality difference threshold for a difference between a signal quality of a neighboring cell and a signal quality of a local cell, and the terminal device performing cell reselection according to the indication information includes:

if the indication information indicates that the first cell supports the primary cell function, the terminal device determining whether to reselect from the second cell to the first cell according to whether the difference between the signal quality of the first cell and the signal quality of the second cell wherein the terminal device currently camps exceeds the signal quality difference threshold; or if the indication information indicates that the first cell does not support the primary cell function, the terminal device determining not to reselect from the second cell to the first cell.

In view of the first aspect, in some implementations of the first aspect, after the terminal device determines to perform cell reselection, the method further includes:

if the second frequency priority information indicates that the priority of the frequency points of the unlicensed frequency band is higher than the priority of the frequency points of the licensed frequency band, performing cell reselection on other cell at the same frequency point or at a different frequency point in the unlicensed frequency band; or if the second frequency priority information indicates that the priority of the frequency points of the licensed frequency band is higher than the priority of the frequency points of the unlicensed frequency band, performing cell reselection on other cell at the same frequency point or at a different frequency point in the licensed frequency band.

In a second aspect, there is provided a method for selecting a cell, including:

a network device determining second configuration information according to at least one of capability of a terminal device, subscription information, and preference of a terminal device; and the network device sending the second configuration information to the terminal device.

In a third aspect, there is provided a terminal device, to perform the method in the first aspect or in any of the implementations of the first aspect. Specifically, the device includes units for performing the method in the first aspect or in any of the implementations of the first aspect.

In a fourth aspect, there is provided a terminal device. The device includes: a memory, a processor, an input interface, and an output interface. The memory, the processor, the input interface and the output interface are connected through a bus system. The memory is configured to store instructions, and the processor is configured to execute the instructions stored in the memory, and configured to perform the method in the first aspect or in any of the implementations of the first aspect.

In a fifth aspect, there is provided a network device, to perform the method in the second aspect or in any of the implementations of the second aspect. Specifically, the device includes units for performing the method in the second aspect or in any of the implementations of the second aspect.

In a sixth aspect, there is provided a network device. The device includes: a memory, a processor, an input interface, and an output interface. The memory, the processor, the input interface and the output interface are connected through a bus system. The memory is configured to store instructions, and the processor is configured to execute the instructions stored in the memory, and configured to perform the method in the second aspect or in any of the implementations of the second aspect.

In a seventh aspect, there is provided a computer storage medium for storing computer software instructions configured to perform the method in the first aspect or in any of the implementations of the first aspect and includes computer software instructions designed to perform the above aspect.

In an eighth aspect, there is provided a computer program product including instructions, which when being executed on a computer, cause the computer to perform the method in the first aspect or in any of the implementations of the first aspect.

In a ninth aspect, there is provided a computer storage medium for storing computer software instructions configured to perform the method in the second aspect or in any of the implementations of the second aspect and includes computer software instructions designed to perform the above aspect.

In a tenth aspect, there is provided a computer program product including instructions, which when being executed on a computer, cause the computer to perform the method in the second aspect or in any of the implementations of the second aspect.

DETAILED DESCRIPTION

The technical solutions in the embodiments of the present application will be described below with reference to the drawings.

The technical solutions in the embodiments of the present application can be applied to various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system or a future 5G systems, etc.

Figure 1:
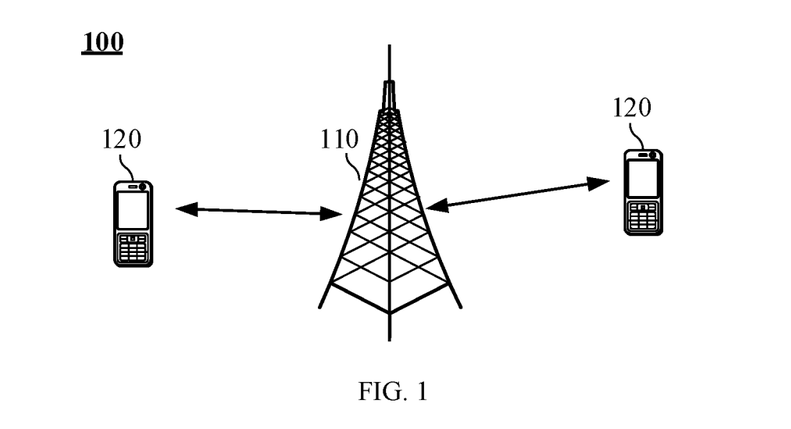
FIG. 1 is a schematic diagram of an application scenario according to an embodiment of the present application.

FIG. 1 shows a wireless communication system 100 applied in an embodiment of the present application. The wireless communication system 100 may include a network device 110. The network device 110 may be a device that communicates with a terminal device. The network device 110 may provide communication coverage for a specific geographic area, and may communicate with a terminal device (such as a UE) located within the coverage area. Optionally, the network device 110 may be a base station (Base Transceiver Station, BTS) in a GSM system or a CDMA system, or a base station (NodeB, NB) in a WCDMA system, or an evolved base station (Evolutional Node B, eNB, or eNodeB) in an LTE system, or a wireless controller in a Cloud Radio Access Network (CRAN), or the network device may be a relay station, an access point, a vehicle-mounted device, a wearable device, a network-side device in a future 5G network or a network device in a future evolved Public Land Mobile Network (PLMN).

The wireless communication system 100 further includes at least one terminal device 120 located within a coverage area of the network device 110. The terminal device 120 may be mobile or fixed. Optionally, the terminal device 120 may refer to an access terminal, user equipment (UE), a user unit, a user station, a mobile station, a mobile site, a remote station, a remote terminal, a mobile device, a user terminal, a terminal, a wireless communication device, a user agent, or a user device. The access terminal can be a cell phone, a cordless phone, a Session Initiation Protocol (SIP) phone, a Wireless Local Loop (WLL) station, a Personal Digital Assistant (PDA), and a handheld device having a wireless communication function, a computing device, or other processing device connected to a wireless modem, a vehicle-mounted device, a wearable device, a terminal device in a future 5G network or a terminal device in a future evolved PLMN.

The LAA mechanism in the LTE system can only configure a Scell to an unlicensed frequency band, and a terminal device cannot camp on the unlicensed frequency band. In 5G New Radio (NR), it is planned to introduce support for the unlicensed frequency band and implementation for two scenarios are in consideration. One scenario is to implement a PCell on a licensed frequency band and a SCell on an unlicensed frequency band. The other scenario is to implement a PCell on an unlicensed frequency band and a SCell on an unlicensed frequency band. Therefore, in some scenarios, a cell corresponding to an unlicensed resource can also support the function of a primary cell, that is, a terminal device can camp on a cell corresponding to an unlicensed resource, or it can also camp on the cell corresponding to the licensed resource. How to implement cell selection or cell reselection for the terminal device on licensed resources and unlicensed resources is a problem worth studying.

In view of this, an embodiment of the present application provides a method for selecting a cell, which can implement cell selection or cell reselection for a terminal device on licensed resources and unlicensed resources.

Figure 2:
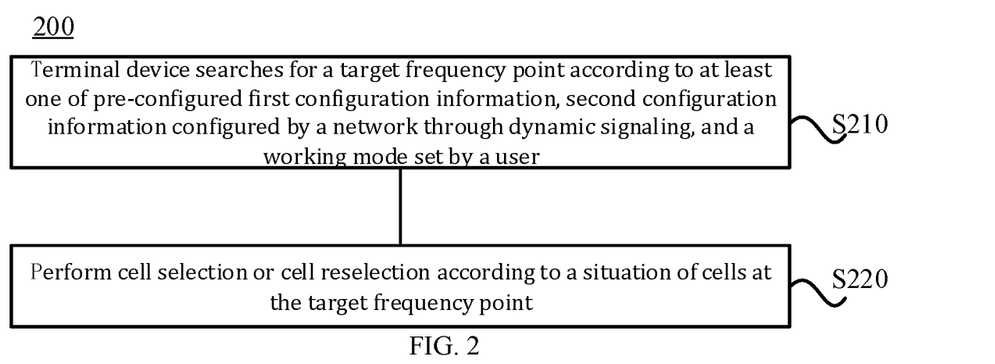
FIG. 2 is a schematic flowchart of a method for selecting a cell according to an embodiment of the present application.

FIG. 2 shows a method 200 for selecting a cell according to an embodiment of the present application, which may be executed by the terminal device in the communication system 100 shown in FIG. 1. As shown in FIG. 2, the method 200 may include the following steps.

At S210, the terminal device searches for a target frequency point according to at least one of pre-configured first configuration information, second configuration information configured by a network through dynamic signaling, and a working mode set by a user;

At S220, cell selection or cell reselection is performed according to a situation of cells at the target frequency point.

It should be understood that, in the embodiment of the present application, the first configuration information may be pre-configured on a Universal Integrated Circuit Card (UICC) of the terminal device, wherein the UICC may be referred to as a subscriber identification module (SIM) card, or may be pre-configured on Mobile Equipment (ME) of the terminal device, wherein the ME of the terminal device refers to a part of the terminal device other than the SIM card, which is not limited in the embodiment of the present application. The second configuration information may be configured by the network device through the dynamic signaling (for example, physical layer signaling). The working mode set by the user may be a working mode set by the user through manual input. For example, the user may set the terminal device to work in a cellular mobile network mode or a wireless local area network mode.

Optionally, in the embodiment of the present application, when the terminal device is currently in a just-turned-on state or an idle state (IDLE), the terminal device may perform cell selection according to the pre-configured first configuration information, or if the user manually set the working mode of the terminal device, the terminal device may perform cell selection according to the working mode set by the user. Alternatively, if the terminal device is currently in a connected state, and the terminal device receives the second configuration information configured by the network device through the dynamic signaling, the terminal device may perform cell reselection according to the second configuration information, or if the user manually set the working mode of the terminal device, the terminal device may perform cell reselection according to the working mode set by the user.

That is, the priority of the working mode set by the user is higher than the priority of the pre-configured first configuration information and the second configuration information configured by the network device through the dynamic signaling. When the user sets the working mode, the terminal device preferentially performs cell selection or cell reselection according to the working mode set by the user. When the user does not manually set the working mode of the terminal device, the terminal device may perform cell selection or cell reselection according to the first configuration information or the second configuration information. For example, if the terminal device is currently in the just-turned-on state or the idle state and has not received the second configuration information configured by the network device, the terminal device may perform cell selection or cell reselection according to the first configuration information. Or if the terminal device is currently in the connected state and the terminal device has received the second configuration information configured by the network device through the dynamic signaling, then the terminal device preferentially performs cell selection or cell reselection according to the second configuration information. When both of the first configuration information and the second configuration information exist, the terminal device preferentially performs cell selection or cell reselection according to the second configuration information configured by the network device.

In the embodiment of the present application, the first configuration information may include information of a first frequency point set and/or first frequency priority information, and the second configuration information includes information of a second frequency point set and/or second frequency priority information.

Specifically, the pre-configured first configuration information may include a set of first frequency points, and at least one frequency point included in the first configuration information may have equal status, that is, no priority order, or the at least one frequency point may also have a priority order, and the first frequency priority information may be used to indicate a priority order of the at least one frequency point. For example, the first frequency priority information may indicate that a frequency point of the unlicensed frequency band has a higher priority than a frequency point of the licensed frequency band, or it may indicate that the frequency point of the licensed frequency band has a higher priority than the frequency point of the unlicensed frequency band.

Similarly, the second configuration information configured by the network device may also include a set of second frequency points, and a frequency point included in the second configuration information may have equal status, that is, no priority order, or the at least one frequency point may also have a priority order, and the second frequency priority information may be used to indicate a priority order of the at least one frequency point in the set of second frequency points. For example, the second frequency priority information may indicate that a frequency point of the unlicensed frequency band has a higher priority than a frequency point of the licensed frequency band, or it may indicate that the frequency point of the licensed frequency band has a higher priority than the frequency point of the unlicensed frequency band.

It should be noted that, in the embodiment of the present application, the pre-configured first configuration information is uniformly configured for a plurality of terminal devices, and may not be suitable to terminal devices with different capabilities or configurations, that is, the first configuration information may not be suitable to a specific terminal device. The second configuration information configured by the network is determined by the network device in view of information such as capability of the specific terminal device, subscription information and preference of the terminal device. That is, the network device can determine the second configuration information for the specific terminal device according to information such as capability of the terminal device, the subscription information and the frequency deployment of the network where the terminal device is currently located, and then configure it to the specific terminal device through the dynamic signaling. Since the second configuration information for the specific terminal device determined by the network device is more reasonable than the first configuration information of the unified configuration, thus implementing a reasonable cell selection or cell reselection for the terminal device.

Optionally, as an embodiment, S210 may specifically include:

if the user sets the working mode to indicate to perform cell selection or cell reselection only in an unlicensed frequency band, the terminal device determining, among the first frequency point set or the second frequency point set, a frequency point inside the unlicensed frequency band, as the target frequency point, and searching for the target frequency point; or if the user does not set the working mode to indicate to perform cell selection or reselection only in the unlicensed frequency band, the terminal device determining, a frequency point among frequency points inside unlicensed frequency band and licensed frequency band as the target frequency point, wherein the frequency points belong to licensed frequency band and the unlicensed frequency band, and performing searching by searching for the target frequency point.

Specifically, since the priority of the working mode of the user equipment is higher than the priority of the first configuration information, when the working mode set by the user indicates that cell selection or cell reselection is performed only in the unlicensed frequency band, the terminal device may determine, among the first frequency point set, the frequency point inside the unlicensed frequency band, as the target frequency point, and search for the target frequency point. Or the terminal device may determine, among the second frequency set, the frequency point inside the unlicensed frequency band, as the target frequency point, and search for the target frequency point. In a specific embodiment, if the terminal device is currently in a just-turned-on state or in an idle state, if the working mode set by the user indicates that cell selection is performed only in the unlicensed frequency band, the terminal device may determine, among the first frequency set, the frequency point inside the unlicensed frequency band, as the target frequency point. Or, if the terminal device is currently in a connected state, the working mode set by the user indicates that cell reselection is performed only in the unlicensed frequency band, the terminal device may determine, among the second frequency set, the frequency point inside the unlicensed frequency band, as the target frequency point.

If the user has not set the working mode of the terminal device, the terminal device may perform cell selection or cell reselection according to the first configuration information or the second configuration information. That is, when the user does not set which frequency band has higher priority, the frequency points in the licensed frequency band and in the unlicensed frequency band have the same priority, and the terminal device may select a frequency point of the licensed frequency band or a frequency point of the unlicensed frequency band from the first frequency point set or the second frequency point set for search. For example, the terminal device may randomly select one or more frequency points from the first frequency point set or the second frequency point set for performing a frequency point search. For example, if the terminal device is currently in a just-turned-on state or in an idle state, the terminal device may select a frequency point of a licensed frequency band or a frequency point of an unlicensed frequency band from the first frequency point set for search. Or if the terminal device is currently in a connected state, the terminal device may select a frequency point of a licensed frequency band or a frequency point of an unlicensed frequency band in the second frequency point set for search.

Optionally, in some embodiments, the transmission mode set by the user may also be used to indicate that the priority of the frequency points of the unlicensed frequency band is higher than the priority of the frequency points of the licensed frequency band, or the priority of the frequency points of the licensed frequency band is higher than the priority of the frequency points of the unlicensed frequency band, which is not limited in the embodiment of the present application.

Optionally, as another embodiment, the first frequency priority information is used to indicate a priority order of the frequency points of the licensed frequency band and the unlicensed frequency band. In this case, S210 may include:

if the priority of the frequency points of the unlicensed frequency band is higher than the priority of the frequency points of the licensed frequency band, the terminal device preferentially determines, among the first frequency point set, the frequency point inside the unlicensed frequency band, as the target frequency point; or if the priority of the frequency points of the licensed frequency band is higher than the priority of the frequency points of the unlicensed frequency band, the terminal device preferentially determines, among the first frequency point set, the frequency point inside the licensed frequency band, as the target frequency point.

Specifically, the first frequency priority information in the first configuration information may be used to indicate a priority order of the frequency points of the licensed frequency band and the frequency points of the unlicensed frequency band. That is, the first frequency priority information may be used to indicate a priority order of the frequency points in the first frequency point set. If the terminal device determines that the priority of the frequency points of the unlicensed frequency band is higher than the priority of the frequency points of the licensed frequency band according to user setting or the first frequency priority information, the terminal device preferentially selects a frequency point of the unlicensed frequency band from the first frequency point set as the target frequency point for performing the frequency point search. Alternatively, if the terminal device determines that the priority of the frequency points of the licensed frequency band is higher than the priority of the frequency points of the unlicensed frequency band according to user setting or the first frequency priority information, the terminal device preferentially selects the frequency point of the licensed frequency band from the first frequency point set as the target frequency point for performing the frequency point search.

Optionally, as still another embodiment, if the network device configures the terminal device with the second configuration information, and the second frequency priority information in the second configuration information is used to indicate priorities of frequency points of the licensed frequency band and the unlicensed frequency band. In this case, S210 may include:

if the priority of the frequency points of the unlicensed frequency band is higher than the priority of the frequency points of the licensed frequency band, the terminal device preferentially determines, among the second frequency point set, the frequency point inside the unlicensed frequency band, as the target frequency point; or if the priority of the frequency points of the licensed frequency band is higher than the priority of the frequency points of the unlicensed frequency band, the terminal device preferentially determines, among the second frequency point set, the frequency point inside the licensed frequency band, as the target frequency point.

Specifically, if the network device configures the terminal device with the second configuration information, and the second frequency priority information is used to indicate priorities of frequency points of the licensed frequency band and the unlicensed frequency band. That is, the second frequency priority information may be used to indicate a priority order of frequency points in the second frequency point set. In this case, if the terminal device determines that the priority of the frequency points of the unlicensed frequency band is higher than the priority of the frequency points of the licensed frequency band according to user setting or the second frequency priority information, the terminal device preferentially selects the frequency point of the unlicensed frequency band from the second frequency point set as the target frequency point for performing the frequency point search. Alternatively, if the terminal device determines that the priority of the frequency points of the licensed frequency band is higher than the priority of the frequency points of the unlicensed frequency band according to user setting or the second frequency priority information, the terminal device preferentially selects the frequency point of the licensed frequency band from the second frequency point set as the target frequency point for performing the frequency point search.

In general, when the network device does not configure the terminal device with the second configuration information, the terminal device may perform the frequency point search according to the first configuration information and the working mode set by the user. Specifically, if the user does not set the working mode, the terminal device may select the frequency point of the licensed frequency band or the unlicensed frequency band from the first frequency point set for performing the frequency point search; or if the working mode set by the user indicates that the cell selection or cell reselection is performed only in the unlicensed frequency band, the terminal device may select the frequency point of the unlicensed frequency band from the first frequency point set for performing the frequency point search; or if the working mode set by the user indicates that the priority of the frequency points of the unlicensed frequency band is higher than the priority of the frequency points of the licensed frequency band, the terminal device may preferentially select, among the first frequency point set, the frequency point inside the unlicensed frequency band, for performing the frequency point search; or if the working mode set by the user indicates that the priority of the frequency points of the licensed frequency band is higher than the priority of the frequency points of the unlicensed frequency band, the terminal device may preferentially select, among the first frequency point set, a frequency point inside the licensed frequency band, for performing the frequency point search.

Similarly, if the network device configures the terminal device with the second configuration information, the terminal device may perform the frequency point search according to the second configuration information and the working mode set by the user. Specifically, if the user does not set a working mode, the terminal device may select a frequency point of the licensed frequency band or the unlicensed frequency band from the second frequency point set for performing the frequency point search; or if the working mode set by the user indicates that the cell selection or cell reselection is performed only in the unlicensed frequency band, the terminal device may select the frequency point of the unlicensed frequency band from the second frequency point set for performing the frequency point search; or if the working mode set by the user indicates that the priority of the frequency points of the unlicensed frequency band is higher than the priority of the frequency points of the licensed frequency band, the terminal device may preferentially select, among the second frequency point set, the frequency point inside to the unlicensed frequency band, for performing the frequency point search; or if the working mode set by the user indicates that the priority of the frequency points of the licensed frequency band is higher than the priority of the frequency points of the unlicensed frequency band, the terminal device may preferentially select, among the second frequency point set, the frequency point inside the licensed frequency band, for performing the frequency point search.

In the following, it is described in detail how the terminal device performs cell selection or cell reselection according to the situation of cell corresponding to the frequency point searched out.

Scenario 1: Cell Selection Scenario

In this scenario 1, the terminal device receives a master information block MIB of the first cell corresponding to the target frequency point, the MIB includes indication information, and the indication information is used to indicate whether the first cell supports a primary cell function.

Specifically, if the terminal device performs a frequency point search according to the determined target frequency point, searches out a first cell on the target frequency point, and receives a synchronization signal block (SS block) from the first cell. The synchronization signal block may include a primary synchronization signal (PSS), a secondary synchronization signal (SSS), and other downlink signals. The terminal device may perform downlink synchronization according to the SS block. The terminal device may also receive other system information, for example, a Master Information Block (MIB) and a Remaining Minimum System Information (RMSI). In the embodiment of the present application, the MIB may include indication information, and the indication information may be used to indicate whether the first cell supports the primary cell function, or whether the first cell supports standalone operation. The indication information may be 1-bit indication information. For example, the 1-bit indication information may be set to 0 to indicate that the first cell does not support the primary cell function, and the 1-bit indication information is set to 1 to indicate that the first cell supports the primary cell function.

Case 1: The indication information indicates that the first cell supports a primary cell function.

In this case, the terminal device may attempt to camp on the first cell. Specifically, the terminal device may perform measurement based on the SS block of the first cell, determine the signal quality of the first cell, and determine whether to camp on the first cell according to the signal quality of the first cell. For example, the terminal device may determine to camp on the first cell when the signal quality of the first cell reaches a camping threshold, and determine not to camp on the first cell if the signal quality of the first cell does not reach the camping threshold. Further, the terminal device may also search for other frequency points, and perform cell selection according to the conditions of the cells corresponding to the other frequency points.

Case 2: The indication information indicates that the first cell does not support a primary cell function.

In this case, the terminal device may no longer measure and attempt to camp on the first cell. Further, the terminal device may also search for other frequency points and perform a cell selection according to the conditions of the cells corresponding to the other frequency points.

Scenario 2: Cell Reselection Scenario

In this scenario 2, the method 200 may also include:

the terminal device receiving a master information block MIB of a first cell corresponding to the target frequency point, wherein the MIB includes indication information, and the indication information is used to indicate whether the first cell supports a primary cell function.

Specifically, if the terminal device performs a frequency point search according to the determined target frequency point, a first cell on the target frequency point is searched out, receives an SS block from the first cell, and the SS block may include a PSS, a SSS, and other downlink signals. The terminal device may perform downlink synchronization according to the SS block. Further, the terminal device may also receive other system information, such as the main information block MIB and RMSI. Optionally, the MIB may include indication information, and the indication information may be used to indicate whether the first cell supports the primary cell function, or in other words, whether the first cell supports a standalone operation. The indication information may be 1-bit indication information. For example, the 1-bit indication information may be set to 0 to indicate that the first cell does not support the primary cell function, and the 1-bit indication information is set to 1 to indicate that the first cell supports the primary cell function.

Further, the method 200 may further include:

the terminal device receiving a system information block SIB of the first cell corresponding to the target frequency point, wherein the SIB includes a cell reselection condition, and the cell reselection condition includes a signal quality difference threshold for a difference between a signal quality of a neighboring cell and a signal quality of a local cell. In the case, the terminal device may perform cell reselection according to the indication information and the cell reselection condition.

Specifically, if the terminal device currently camps in a second cell (that is, the local cell), the terminal device may determine whether to reselect from the second cell to the first cell according to whether the first cell supports the primary cell function and whether the signal quality difference between the first cell and the second cell exceeds the signal quality difference threshold. In a specific embodiment, if the indication information indicates that the first cell does not support the primary cell function, the terminal device determines not to reselect from the second cell to the first cell; or, if the first cell supports the primary cell function, the terminal device may further measure an SS block of the first cell, determine a signal quality of the first cell, and then according to the relationship between the difference between the signal quality of the first cell and the signal quality of the second cell and the signal quality threshold in the cell reselection condition, determine whether to reselect to the first cell. For example, the terminal device may determine to reselect from the second cell to the second cell when the difference between the signal quality of the first cell and the signal quality of the second cell is greater than or equal to the signal quality threshold. Otherwise, the terminal device determines not to reselect from the second cell to the first cell.

Further, if the terminal device determines not to reselect from the second cell to the first cell, the terminal device may continue to search for other frequency points, and perform cell reselection according to the situation of the cells at other frequency points. For example, if the second frequency priority information configured by the network device indicates that the priority of the frequency points of the unlicensed frequency band is higher than the priority of the frequency points of the licensed frequency band, the terminal device performs cell reselection on other cell at the same frequency point or at a different frequency point in the unlicensed frequency band; or if the second frequency priority information indicates that the priority of the frequency points of the licensed frequency band is higher than the priority of the frequency points of the unlicensed frequency band, the terminal device performs cell reselection on other cell at the same frequency point or at a different frequency point in the licensed frequency band.

The method for selecting a cell according to an embodiment of the present application has been described in detail from the perspective of a terminal device and with reference to FIG. 2 above. The method for selecting a cell according to another embodiment of the application will be described in detail below from the perspective of a network device and with reference to FIG. 3. It should be understood that the description on the network device side and the description on the terminal device side correspond to each other. Similar descriptions can be referred to above, details of which will not be repeated here to avoid repetition.

Figure 3:
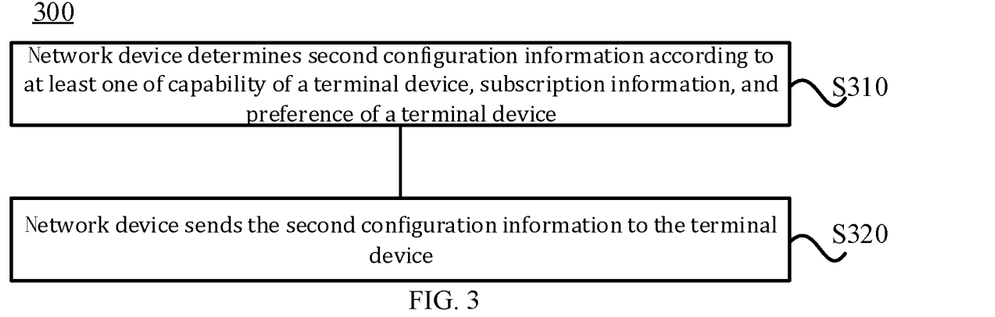
FIG. 3 is a schematic flowchart of a method for selecting a cell according to another embodiment of the present application.

FIG. 3 is a schematic flowchart of a method 300 for selecting a cell according to another embodiment of the present application. The method 300 may be executed by a terminal device in the communication system shown in FIG. 1. As shown in FIG. 3, the method 300 includes the following steps.

At S310, the network device determines second configuration information according to at least one of capability of the terminal device, subscription information, and preference of the terminal device.

At S320, the network device sends the second configuration information to the terminal device.

Figure 4:
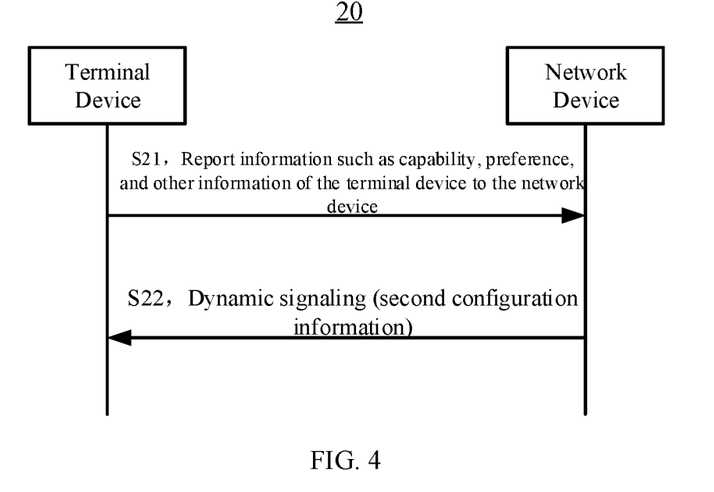
FIG. 4 is a schematic flowchart of a method for selecting a cell according to still another embodiment of the present application.

FIG. 4 is a method for selecting a cell according to an embodiment of the present application described from the perspective of interaction between devices. As shown in FIG. 4, the method 20 includes the following steps.

At S21, the terminal device reports information such as capability, preference, and other information of the terminal device to the network device.

At S22, the network device determines the second configuration information according to the information reported by the terminal device, and then sends the second configuration information to the terminal device through dynamic signaling.

For example, the dynamic signaling may be physical layer signaling.

Therefore, in the method for selecting a cell according to the embodiment of the present application, a terminal device may report information such as its capability and preference to a network device, so that the network device generates second configuration information for the terminal device according to the above information reported by the terminal device, and then configures the terminal device with the second configuration information through dynamical signaling. Therefore, in the method for selecting a cell according to the embodiment of the present application, the network device can configure a specific terminal device with specific second configuration information. Compared to uniformly configuring the same first configuration information for all terminal devices, cell selection or cell reselection can be performed more reasonably for the terminal device.

The method embodiments of the present application have been described in detail above with reference to FIGS. 2 to 4, and the device embodiments of the present application will be described in detail below with reference to FIGS. 5 to 8. It should be understood that the device embodiments and method embodiments correspond to each other, and similar descriptions can be referred to the method embodiments.

Figure 5:
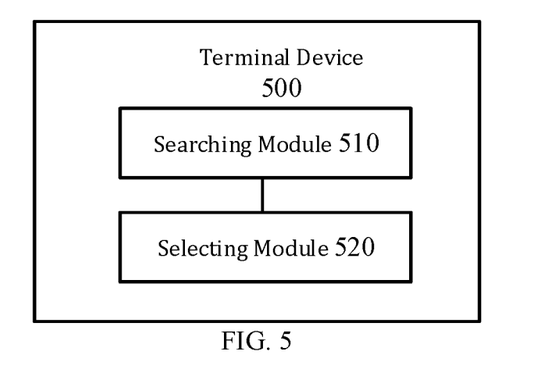
FIG. 5 shows a schematic block diagram of a terminal device according to an embodiment of the present application.

FIG. 5 shows a schematic block diagram of a terminal device 500 according to an embodiment of the present application. As shown in FIG. 5, the terminal device 500 includes:

a searching module 510 configured to search for a target frequency point according to at least one of pre-configured first configuration information, second configuration information configured by a network through dynamic signaling, and a working mode set by a user; and a selecting module 520 configured to perform, according to a situation of cells at the target frequency point, cell selection or cell reselection.

Optionally, in some embodiments, the first configuration information includes information of a first frequency point set and/or first frequency priority information, and the second configuration information includes information of a second frequency point set and/or second frequency priority information.

Optionally, in some embodiments, the second frequency priority information is determined by the network device according to at least one of the capability of the terminal device, subscription information and the reference of the terminal device and is configured to the terminal device through dynamic signaling.

Optionally, in some embodiments, the second frequency priority information has a priority higher than a priority of the first frequency priority information, and the working mode set by the user has a priority higher than the priority of the first configuration information and the second configuration information.

Optionally, in some embodiments, the searching module 510 is specifically configured to:

if the user sets the working mode to indicate to perform cell selection or cell reselection only in an unlicensed frequency band, determine, among the first frequency point set or the second frequency point set, a frequency point inside the unlicensed frequency band, as the target frequency point and search for the target frequency point; or if the user does not set the working mode to indicate to perform cell selection or reselection only in the unlicensed frequency band, determine a frequency point among frequency points inside unlicensed frequency band and licensed frequency band as the target frequency point, wherein the frequency points belong to the first frequency point set or the second frequency point set, and perform searching by searching for the target frequency point.

Optionally, in some embodiments, the first frequency priority information is used to indicate a priority order of the frequency points of the licensed frequency band and the unlicensed frequency band, the searching module 510 is specifically configured to:

if the priority of the frequency points of the unlicensed frequency band is higher than the priority of the frequency points of the licensed frequency band, preferentially determine, among the first frequency point set, a frequency point inside the unlicensed frequency band, as the target frequency point, and search for the target frequency point; or if the priority of the frequency points of the licensed frequency band is higher than the priority of the frequency points of the unlicensed frequency band, preferentially determine, among the first frequency point set, a frequency point inside the licensed frequency band, as the target frequency point, and search for the target frequency point.

Optionally, in some embodiments, the second frequency priority information is used to indicate a priority order of the frequency points of the licensed frequency band and the unlicensed frequency band, the searching module 510 is specifically configured to:

if the priority of the frequency points of the unlicensed frequency band is higher than the priority of the frequency points of the licensed frequency band, preferentially determine, among the second frequency point set, a frequency point inside the unlicensed frequency band, as the target frequency point, and search for the target frequency point; or if the priority of the frequency points of the licensed frequency band is higher than the priority of the frequency points of the unlicensed frequency band, preferentially determine, among the second frequency point set, a frequency point inside the licensed frequency band, as the target frequency point, and search for the target frequency point.

Optionally, in some embodiments, the terminal device 500 also includes:

a communication module configured to receive a master information block MIB of a first cell corresponding to the target frequency point, wherein the MIB includes indication information, and the indication information is used to indicate whether the first cell supports a primary cell function.

Optionally, in some embodiments, the selecting module 520 is specifically configured to:

perform cell selection or cell reselection according to the indication information.

Optionally, in some embodiments, the selecting module 520 is specifically configured to:

if the indication information indicates that the first cell supports a primary cell function, determine whether to camp on the first cell according to a signal quality of the first cell; or if the indication information indicates that the first cell does not support a primary cell function, determine not to camp on the first cell.

Optionally, in some embodiments, the communication module is also configured to:

receive a system information block SIB of the first cell corresponding to the target frequency point, wherein the SIB includes a cell reselection condition, and the cell reselection condition includes a signal quality difference threshold for a difference between a signal quality of a neighboring cell and a signal quality of a local cell, and the selecting module is specifically configured to:

if the indication information indicates that the first cell supports the primary cell function, determine whether to reselect from the second cell to the first cell according to whether the difference between the signal quality of the first cell and the signal quality of the second cell where the terminal device currently camps exceeds the signal quality difference threshold; or if the indication information indicates that the first cell does not support the primary cell function, determine not to reselect from the second cell to the first cell.

Optionally, in some embodiments, the selecting module 520 is further configured to:

if the second frequency priority information indicates that the priority of the frequency points of the unlicensed frequency band is higher than the priority of the frequency points of the licensed frequency band, perform cell reselection on other cell at the same frequency point or at a different frequency point in the unlicensed frequency band; or if the second frequency priority information indicates that the priority of the frequency points of the licensed frequency band is higher than the priority of the frequency points of the unlicensed frequency band, perform cell reselection on other cell at the same frequency point or at a different frequency point in the licensed frequency band.

It should be understood that the terminal device 500 according to the embodiment of the present application may correspond to the terminal device in the method embodiment of the present application, and the above and other operations and/or functions of each unit in the terminal device 500 are respectively to implement corresponding steps of the terminal device in the method shown in FIG. 2 or FIG. 4, which will not be repeated herein for brevity.

Figure 6:
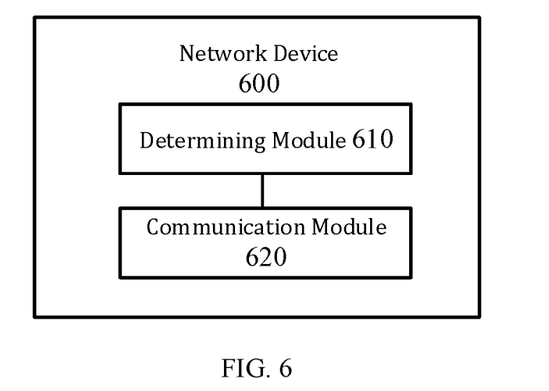
FIG. 6 shows a schematic block diagram of a network device according to an embodiment of the present application.

FIG. 6 shows a schematic block diagram of a network device according to an embodiment of the present application. The network device 600 in FIG. 6 includes:

a determining module 610 configured to determine second configuration information according to at least one of capability of a terminal device, subscription information, and preference of the terminal device; and a communication module 620 configured to send the second configuration information to the terminal device.

Specifically, the network device 600 may correspond to (for example, may be configured on or be) the network device described in the method 300, and each module or unit in the network device 600 is configured to perform each action or step performed by the network device in the above method 300 or method 20, respectively. Here, in order to avoid redundant description, detailed descriptions are omitted.

Figure 7:
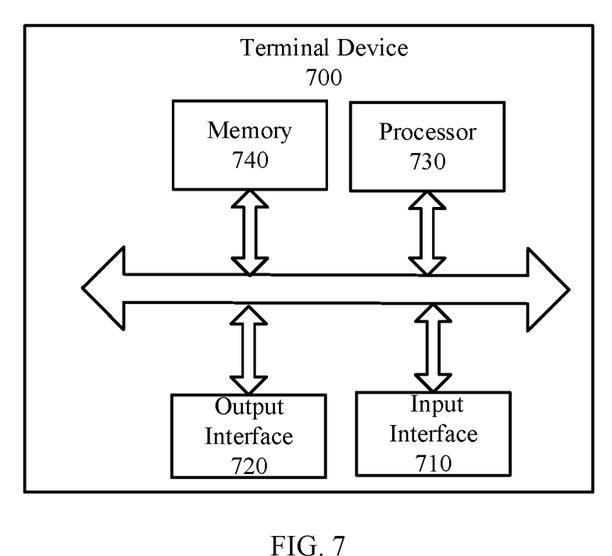
FIG. 7 shows a schematic block diagram of a terminal device according to another embodiment of the present application.

As shown in FIG. 7, an embodiment of the present application further provides a terminal device 700. The terminal device 700 may be the terminal device 500 in FIG. 5, which can be used to execute the corresponding part of the terminal device in the method 200 shown in FIG. 2 or FIG. 4. The terminal device 700 includes: an input interface 710, an output interface 720, a processor 730, and a memory 740. The input interface 710, the output interface 720, the processor 730, and the memory 740 may be connected through a bus system. The memory 740 is configured to store a program, an instruction, or a code. The processor 730 is configured to execute the program, the instruction, or the code in the memory 740 to control the input interface 710 to receive signals, control the output interface 720 to send signals, and complete operations in the above method embodiments.

It should be understood that, in the embodiment of the present application, the processor 730 may be a Central Processing Unit (CPU), and the processor 730 may also be another general-purpose processor or digital signal processor (DSP), application specific integrated circuit (ASIC), off-the-shelf programmable gate array (FPGA) or other programmable logic devices, discrete gate or transistor logic devices, discrete hardware components, etc. A general-purpose processor may be a microprocessor, or the processor may be any conventional processor or the like.

The memory 740 may include a read-only memory and a random access memory, and provide instructions and data to the processor 730. A part of the memory 740 may further include a non-volatile random access memory. For example, the memory 740 may also store information of a device type.

In the implementation process, each part of the above method may be completed by using hardware integrated logic circuits or instructions in the form of software in the processor 730. The content of the method disclosed in connection with the embodiments of the present application may be directly embodied as being executed by a hardware processor, or may be executed and completed by using a combination of hardware and software modules in the processor. A software module may be located in a well-known storage medium such as a random access memory, a flash memory, a read-only memory, a programmable read-only memory, or an electrically erasable programmable memory, a register, and the like. The storage medium is located in the memory 740, and the processor 730 reads the information in the memory 740 and completes the content of the above method in combination with its hardware. To avoid repetition, it will not be described in detail here.

In a specific embodiment, the searching module 510 and the selecting module 520 included in the terminal device 500 in FIG. 5 may be implemented by the processor 730 of FIG. 7, and the communication module included in the terminal device 500 in FIG. 5 may be implemented with the input interface 710 and the output interface 720 of FIG. 7.

Figure 8:
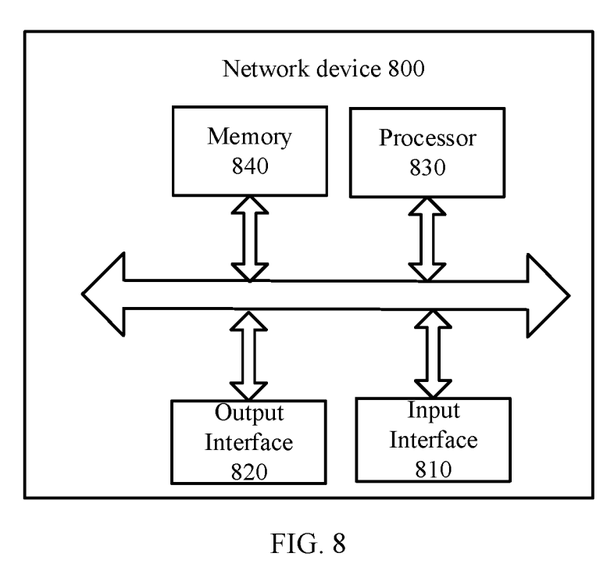
FIG. 8 shows a schematic block diagram of a network device according to another embodiment of the present application.

As shown in FIG. 8, an embodiment of the present application further provides a network device 800. The network device 800 may be the network device 600 in FIG. 6, which can be used to execute the method 300 shown in FIG. 3 or the corresponding part of the network device in the method 20 shown in FIG. 4. The network device 800 includes: an input interface 810, an output interface 820, a processor 830, and a memory 840. The input interface 810, the output interface 820, the processor 830, and the memory 840 may be connected through a bus system. The memory 840 is configured to store a program, an instruction, or a code. The processor 830 is configured to execute the program, the instruction, or the code in the memory 840 to control the input interface 810 to receive signals, control the output interface 820 to send signals, and complete operations in the above method embodiments.

It should be understood that, in the embodiment of the present application, the processor 830 may be a Central Processing Unit (CPU), and the processor 830 may also be another general-purpose processor or digital signal processor (DSP), application specific integrated circuit (ASIC), off-the-shelf programmable gate array (FPGA) or other programmable logic devices, discrete gate or transistor logic devices, discrete hardware components, etc. A general-purpose processor may be a microprocessor, or the processor may be any conventional processor or the like.

The memory 840 may include a read-only memory and a random access memory, and provide instructions and data to the processor 830. A part of the memory 840 may further include a non-volatile random access memory. For example, the memory 840 may also store information of a device type.

In the implementation process, each part of the above method may be completed by using a hardware integrated logic circuits or instructions in the form of software in the processor 830. The content of the method disclosed in connection with the embodiments of the present application may be directly embodied as being executed by a hardware processor, or may be executed and completed by using a combination of hardware and software modules in the processor. A software module may be located in a well-known storage medium such as a random access memory, a flash memory, a read-only memory, a programmable read-only memory, or an electrically erasable programmable memory, a register, and the like. The storage medium is located in the memory 840, and the processor 830 reads the information in the memory 840 and completes the content of the above method in combination with its hardware. To avoid repetition, it will not be described in detail here.

In a specific implementation, the determining module 610 included in the network device 600 in FIG. 6 may be implemented with the processor 830 of FIG. 8, and the communication module 620 included in the network device 600 in FIG. 6 may be implemented with the input interface 810 and the output interface 820 of FIG. 8.

An embodiment of the present application further provides a computer-readable storage medium, wherein the computer-readable storage medium stores one or more programs, the one or more programs include instructions, which when being executed by a portable electronic device including multiple application programs, can cause the portable electronic device to execute the methods in the embodiments shown in FIG. 2 to FIG. 4.

An embodiment of the present application further provides a computer program. The computer program includes instructions, which when the computer program is executed by a computer, can cause the computer to execute a corresponding process of the methods shown in FIG. 2 to FIG. 4.

It should be appreciated by those skilled in the art that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. A professional technician can use different methods to implement the described functions for each specific application, but such implementation should not be considered to be beyond the scope of this application.

Those skilled in the art can clearly understand that, for the convenience and brevity of description, the specific working processes of the systems, devices, and units described above can refer to the corresponding processes in the above method embodiments, which will not be repeated herein.

In the several embodiments provided in this application, it should be understood that the disclosed systems, devices, and methods can be implemented in other ways. For example, the device embodiments described above are only schematic. For example, the division of the unit is only a logical function division. In actual implementation, there may be another division manner. For example, multiple units or components may be combined or may be integrated into another system, or some features can be ignored or skipped. In addition, the displayed or discussed mutual coupling or direct coupling or communication connection may be indirect coupling or communication connection through some interfaces, devices or units, which may be electrical, mechanical or in other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of this embodiment.

In addition, each functional unit in each embodiment of the present application may be integrated into one processing unit, or each of the units may exist separately in physical, or two or more units may be integrated into one unit.

When the functions are implemented in the form of software functional units and sold or used as independent products, the functions can be stored in a computer-readable storage medium. Based on such an understanding, the technical solution of the present application is, in essence, or with a part that contributes to the existing technology or a part of the technical solution, may be embodied in the form of a software product, wherein the computer software product is stored in a storage medium, including a number of instructions to enable a computer device (which may be a personal computer, a server, or a network device, etc.) to perform all or part of the steps of the method described in the embodiments of the present application. The above storage media include: a U disk, a mobile hard disk, a read-only memory (ROM, Read-Only Memory), a random access memory (RAM, Random Access Memory), a magnetic disk, or an optical disk and other medium that can store program codes.

The above is only specific embodiments of the present application, but the protection scope of the present application is not limited thereto, and modifications or substitutions easily conceived by any person skilled in the art within the technical scope of the present application should be covered by the protection scope of the present application. Therefore, the protection scope of the present application shall be subject to the protection scope of the claims.

What is claimed is:

1. A method for selecting a cell, comprising:
searching, by a terminal device, for a target frequency point according to at least one of pre-configured first configuration information, second configuration information configured by a network device through dynamic signaling, and a working mode set by a user; and
performing, according to a situation of cells at the target frequency point, cell selection or cell reselection;
wherein the first configuration information comprises information of a first frequency point set and/or first frequency priority information, and the second configuration information comprises information of a second frequency point set and/or second frequency priority information; and
wherein searching, by the terminal device, for the target frequency point according to at least one of the pre-configured first configuration information, the second configuration information configured by the network device through the dynamic signaling, and the working mode set by the user, comprises:
if the user sets the working mode to indicate to perform cell selection or cell reselection only in an unlicensed frequency band, determining, by the terminal device among the first frequency point set or the second frequency point set, a frequency point inside the unlicensed frequency band as the target frequency point, and searching for the target frequency point; or
if the user does not set the working mode to indicate to perform cell selection or reselection only in an unlicensed frequency band, determining, by the terminal device, a frequency point among frequency points inside unlicensed frequency band and licensed frequency band as the target frequency point, wherein the frequency points belong to the first frequency point set or the second frequency point set, and performing searching by searching for the target frequency point.

2. The method according to claim 1, wherein the second frequency priority information is determined by the network device according to at least one of the capability of the terminal device, subscription information and the reference of the terminal device and is configured to the terminal device through dynamic signaling.

3. The method according to claim 1, wherein the second frequency priority information has a priority higher than a priority of the first frequency priority information, and the working mode set by the user has a priority higher than the first configuration information and the second configuration information.

4. The method according to claim 1, wherein the first frequency priority information is used to indicate a priority order of the frequency points of the licensed frequency band and the unlicensed frequency band, and searching, by the terminal device, for the target frequency point according to at least one of the pre-configured first configuration information, the second configuration information configured by the network device through the dynamic signaling, and the working mode set by the user comprises:
if the priority of the frequency points of the unlicensed frequency band is higher than the priority of the frequency points of the licensed frequency band, determining, preferentially by the terminal device among the first frequency point set, the frequency point inside the unlicensed frequency band, as the target frequency point, and searching for the target frequency point; or
if the priority of the frequency points of the licensed frequency band is higher than the priority of the frequency points of the unlicensed frequency band, determining, preferentially by the terminal device among the first frequency point set, the frequency point inside the licensed frequency band, as the target frequency point, and searching for the target frequency point.

5. The method according to claim 1, wherein the second frequency priority information is used to indicate a priority order of the frequency points of the licensed frequency band and the unlicensed frequency band, and searching, by the terminal device, for the target frequency point according to at least one of the pre-configured first configuration information, the second configuration information configured by the network device through the dynamic signaling, and the working mode set by the user comprises:
if the priority of the frequency points of the unlicensed frequency band is higher than the priority of the frequency points of the licensed frequency band, determining, preferentially by the terminal device among the second frequency point set, the frequency point inside the unlicensed frequency band, as the target frequency point, and searching for the target frequency point; or
if the priority of the frequency points of the licensed frequency band is higher than the priority of the frequency points of the unlicensed frequency band, determining, preferentially by the terminal device among the second frequency point set, the frequency point inside the licensed frequency band, as the target frequency point, and searching for the target frequency point.

6. A method for selecting a cell, comprising:
searching, by a terminal device, for a target frequency point according to at least one of pre-configured first configuration information, second configuration information configured by a network device through dynamic signaling, and a working mode set by a user; and
performing, according to a situation of cells at the target frequency point, cell selection or cell reselection; and
receiving, by the terminal device, a master information block MIB of a first cell corresponding to the target frequency point, wherein the MIB comprises indication information, and the indication information is used to indicate whether the first cell supports a primary cell function; and
wherein the performing cell selection or cell reselection according to the situation of cells at the target frequency point comprises: performing, by the terminal device, cell selection or cell reselection according to the indication information.

7. The method according to claim 6, wherein performing, by the terminal device, cell selection according to the indication information comprises:
if the indication information indicates that the first cell supports the primary cell function, determining, by the terminal device, whether to camp on the first cell according to a signal quality of the first cell; or
if the indication information indicates that the first cell does not support the primary cell function, determining, by the terminal device, not to camp on the first cell.

8. The method according to claim 6, further comprising:
receiving, by the terminal device, a system information block SIB of the first cell corresponding to the target frequency point, wherein the SIB comprises a cell reselection condition, and the cell reselection condition comprises a signal quality difference threshold for a difference between a signal quality of a neighboring cell and a signal quality of a local cell, and performing, by the terminal device, cell reselection according to the indication information comprises:
if the indication information indicates that the first cell supports the primary cell function, determining, by the terminal device, whether to reselect from the second cell to the first cell according to whether the difference between the signal quality of the first cell and the signal quality of the second cell where the terminal device currently camps exceeds the signal quality difference threshold; or
if the indication information indicates that the first cell does not support the primary cell function, determining, by the terminal device, not to reselect from the second cell to the first cell; or
wherein after the terminal device determines to perform cell reselection, the method further comprises:
if the second frequency priority information indicates that the priority of the frequency points of the unlicensed frequency band is higher than the priority of the frequency points of the licensed frequency band, performing cell reselection on other cell at the same frequency point or at a different frequency point in the unlicensed frequency band; or
if the second frequency priority information indicates that the priority of the frequency points of the licensed frequency band is higher than priority of the frequency points of the unlicensed frequency band, performing cell reselection on other cell at the same frequency point or at the different frequency point in the licensed frequency band.

9. A terminal device, comprising a memory, a processor, an input interface, and an output interface, wherein the memory is configured to store instructions, and the processor is configured to execute the instructions stored in the memory, and the terminal device is configured to:
search for a target frequency point according to at least one of pre-configured first configuration information, second configuration information configured by a network device through dynamic signaling, and a working mode set by a user; and
perform, according to a situation of cells at the target frequency point, cell selection or cell reselection;
wherein the first configuration information comprises information of a first frequency point set and/or first frequency priority information, and the second configuration information comprises information of a second frequency point set and/or second frequency priority information; and
wherein the terminal device is further configured to:
if the user sets the working mode to indicate to perform cell selection or cell reselection only in an unlicensed frequency band, determine, among the first frequency point set or the second frequency point set, a frequency point inside the unlicensed frequency band, as the target frequency point, and search for the target frequency point; or
if the user does not set the working mode to indicate to perform cell selection or reselection only in an unlicensed frequency band, determine a frequency point among frequency points inside unlicensed frequency band and licensed frequency band as the target frequency point, wherein the frequency points belong to the first frequency point set or the second frequency point set, and perform searching by searching for the target frequency point.

10. The terminal device according to claim 9, wherein the second frequency priority information is determined by the network device according to at least one of the capability of the terminal device, the subscription information and the reference of the terminal device and is configured to the terminal device through the dynamic signaling.

11. The terminal device according to claim 9, wherein the second frequency priority information has a priority higher than a priority of the first frequency priority information, and the working mode set by the user has a priority higher than the first configuration information and the second configuration information.

12. The terminal device according to claim 9, wherein the first frequency priority information is used to indicate a priority order of the frequency points of the licensed frequency band and the unlicensed frequency band, and the terminal device is configured to:
if the priority of the frequency points of the unlicensed frequency band is higher than the priority of the frequency points of the licensed frequency band, preferentially determine, among the first frequency point set, the frequency point inside the unlicensed frequency band, as the target frequency point, and search for the target frequency point; or
if the priority of the frequency points of the licensed frequency band is higher than the priority of the frequency points of the unlicensed frequency band, preferentially determine, among the first frequency point set, the frequency point inside the licensed frequency band, as the target frequency point, and search for the target frequency point.

13. The terminal device according to claim 9, wherein the second frequency priority information is used to indicate a priority order of the frequency points of the licensed frequency band and the unlicensed frequency band, and the terminal device is configured to:
- if the priority of the frequency points of the unlicensed frequency band is higher than the priority of the frequency points of the licensed frequency band, preferentially determine, among the second frequency point set, the frequency point inside the unlicensed frequency band, as the target frequency point, and search for the target frequency point; or
- if the priority of the frequency points of the licensed frequency band is higher than the priority of the frequency points of the unlicensed frequency band, preferentially determine, among the second frequency point set, the frequency point inside the licensed frequency band, as the target frequency point, and search for the target frequency point.

14. The terminal device according to claim 9, wherein the terminal device is configured to:
- a communication module configured to receive a master information block MIB of a first cell corresponding to the target frequency point, wherein the MIB comprises indication information, and the indication information is used to indicate whether the first cell supports a primary cell function; and
- perform cell selection or cell reselection according to the indication information.

15. The terminal device according to claim 14, wherein the terminal device is configured to:
- if the indication information indicates that the first cell supports the primary cell function, determine whether to camp on the first cell according to a signal quality of the first cell; or
- if the indication information indicates that the first cell does not support the primary cell function, determine not to camp on the first cell.

* * * * *